United States Patent
Barton et al.

(10) Patent No.: US 11,425,209 B2
(45) Date of Patent: Aug. 23, 2022

(54) COMMUNICATION SYSTEM

(71) Applicant: Microsoft Technology Licensing, LLC, Redmond, WA (US)

(72) Inventors: Lukas Barton, Prague (CZ); Dan Mihai Dinu, Bucharest (RO); Iryna Kulakova, Prague (CZ); Oleh Babyak, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 474 days.

(21) Appl. No.: 15/160,628

(22) Filed: May 20, 2016

(65) Prior Publication Data

US 2017/0257440 A1    Sep. 7, 2017

(51) Int. Cl.
| | |
|---|---|
| *G06F 15/173* | (2006.01) |
| *H04L 67/51* | (2022.01) |
| *H04L 67/55* | (2022.01) |
| *H04L 67/60* | (2022.01) |
| *H04L 67/567* | (2022.01) |
| *H04L 67/01* | (2022.01) |
| *H04L 67/306* | (2022.01) |
| *H04L 67/02* | (2022.01) |

(52) U.S. Cl.
CPC .............. *H04L 67/16* (2013.01); *H04L 67/26* (2013.01); *H04L 67/2838* (2013.01); *H04L 67/32* (2013.01); *H04L 67/42* (2013.01); *H04L 67/02* (2013.01); *H04L 67/306* (2013.01)

(58) Field of Classification Search
CPC ..... H04L 67/42; H04L 41/026; H04L 51/043; H04L 67/26; H04L 51/24; H04L 43/16; H04L 67/16
See application file for complete search history.

(56) References Cited

U.S. PATENT DOCUMENTS

| | | | |
|---|---|---|---|
| 6,477,565 B1 | 11/2002 | Daswani et al. | |
| 6,742,181 B1* | 5/2004 | Koike | H04L 67/2823 |
| | | | 709/201 |
| 6,901,415 B2 | 5/2005 | Thomas et al. | |

(Continued)

FOREIGN PATENT DOCUMENTS

| | | |
|---|---|---|
| CN | 2930125 Y | 8/2007 |
| CN | 101087263 A | 12/2007 |

(Continued)

OTHER PUBLICATIONS

Crispin, M., "Internet Message Access Protocol-Version 4rev1", In Network Working Group, Request for Comments: 3501, Obsoletes: 2060, Category: Standards Track, Mar. 2003, 108 Pages.

(Continued)

*Primary Examiner* — Suraj M Joshi
*Assistant Examiner* — Ayele F Woldemariam
(74) *Attorney, Agent, or Firm* — Schwegman Lundberg & Woessner, P.A.

(57) ABSTRACT

There is provided a method comprising: transmitting, by a user terminal, to a state server a request for state change information of a service provided by the user terminal; receiving, by the user terminal, an indication of said state change information from the state server; and using, by the user terminal, said received indication to determine whether or not to suppress a polling relating to said service of a master server.

21 Claims, 8 Drawing Sheets

(56) References Cited

U.S. PATENT DOCUMENTS

| | | | |
|---|---|---|---|
| 2002/0042830 A1 | 4/2002 | Bose et al. | |
| 2005/0021728 A1* | 1/2005 | Sugimoto | G06F 3/1204 709/223 |
| 2005/0220034 A1* | 10/2005 | Zaniolo | H04L 47/10 370/252 |
| 2005/0267772 A1 | 12/2005 | Nielsen et al. | |
| 2008/0247320 A1* | 10/2008 | Grah | H04L 41/5012 370/241 |
| 2009/0144359 A1* | 6/2009 | Karlsen | H04L 67/26 709/203 |
| 2009/0210459 A1 | 8/2009 | Nair et al. | |
| 2009/0300169 A1 | 12/2009 | Sagar et al. | |
| 2010/0217852 A1* | 8/2010 | Nishida | H04M 1/72525 709/223 |
| 2011/0113047 A1 | 5/2011 | Guardalben | |
| 2011/0182220 A1 | 7/2011 | Black et al. | |
| 2012/0028614 A1* | 2/2012 | Bertin | H04W 4/001 709/224 |
| 2012/0203932 A1 | 8/2012 | da Costa et al. | |
| 2012/0290740 A1* | 11/2012 | Tewari | H04W 4/00 709/248 |
| 2013/0047034 A1 | 2/2013 | Salomon et al. | |
| 2013/0212420 A1 | 8/2013 | Lawson et al. | |
| 2013/0254710 A1 | 9/2013 | Banti et al. | |
| 2014/0287728 A1* | 9/2014 | Lim | H04L 51/28 455/414.1 |
| 2014/0337472 A1 | 11/2014 | Newton et al. | |
| 2014/0379851 A1 | 12/2014 | LeCroy et al. | |
| 2015/0234787 A1* | 8/2015 | Itamoto | G06F 17/211 715/204 |
| 2016/0110467 A1 | 4/2016 | Hern | |
| 2018/0262580 A1 | 9/2018 | Barton et al. | |
| 2018/0262581 A1 | 9/2018 | Barton et al. | |

FOREIGN PATENT DOCUMENTS

| | | |
|---|---|---|
| CN | 101115094 A | 1/2008 |
| CN | 104539507 A | 4/2015 |
| WO | 2008029133 A1 | 3/2008 |

OTHER PUBLICATIONS

Loreto, S., et al., "Known Issues and Best Practices for the Use of Long Polling and Streaming in Bidirectional HTTP", In Internet Engineering Task Force (IETF), Request for Comments: 6202, Category: Informational, ISSN: 2070-1721, Apr. 2011, 15 Pages.

"International Search Report and Written Opinion Issued in PCT Application No. PCT/US2017/019592", dated Jun. 1, 2017, 13 Pages.

"Using Oracle Mobile Cloud Service", Retrieved on: Feb. 23, 2016—Available at: https://docs.oracle.com/cloud/latest/mobilecs_gs/MCSUA/GUID-7C2A0D49-F898-4886-9A6A-4FF799F776F4.htm#MCSUA-GUID-1CADEDBE-8F48-42DC-AEF4-1C8889AF31B8, 31 pages.

"Non-Final Office Action Issued in U.S. Appl. No. 15/980,416", dated Nov. 29, 2019, 12 Pages.

"Non Final Office Action Issued in U.S. Appl. No. 15/980,078", dated Nov. 18, 2019, 9 Pages.

"First Office Action and Search Report Issued in Chinese Patent Application No. 201780015124.9", (w/ English Translation), dated Jul. 20, 2020, 19 Pages.

"Second Office Action and Search Report Issued in Chinese Patent Application No. 201780015124.9", (w/ English Translation), dated Apr. 9, 2021, 19 Pages.

* cited by examiner

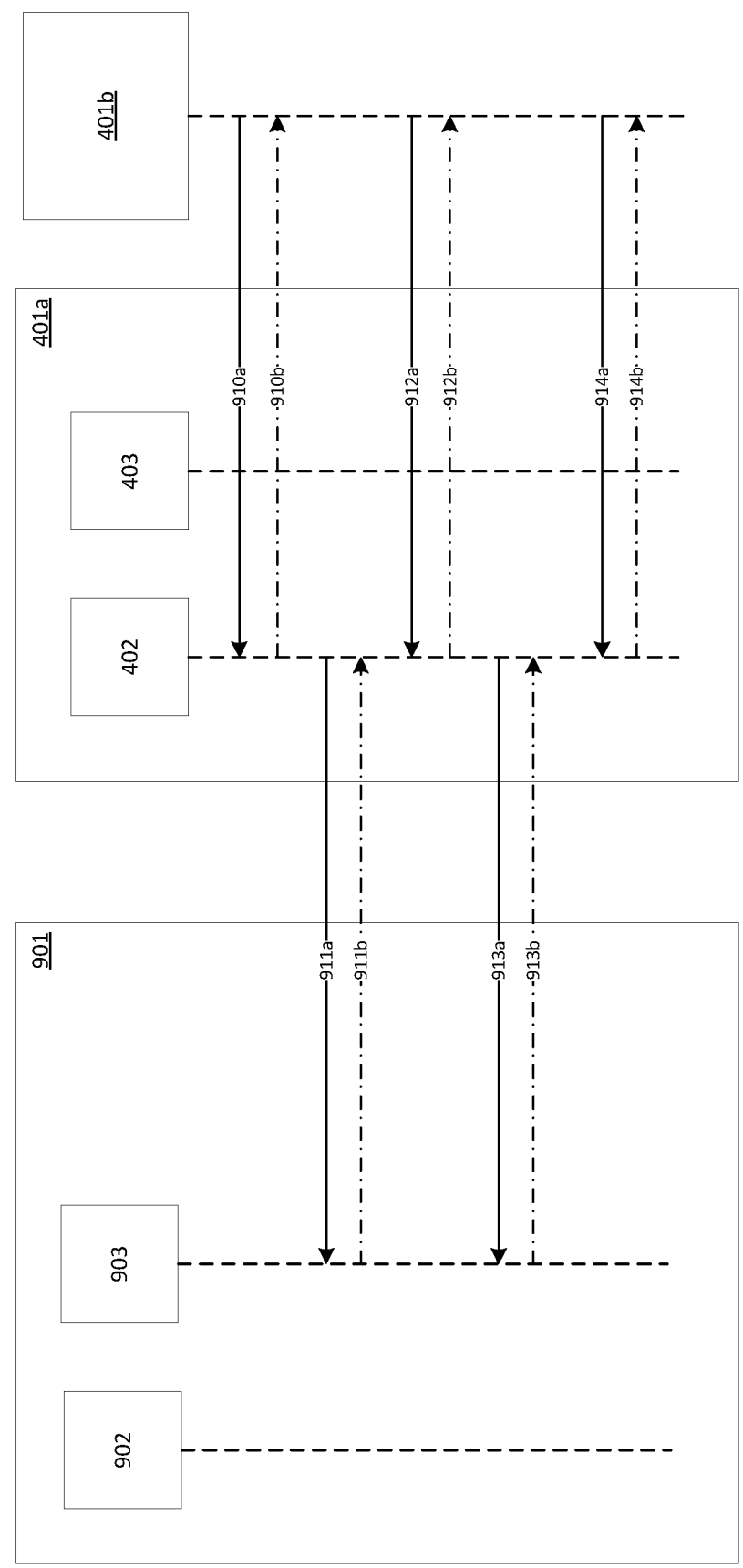

COMMUNICATION SYSTEM

RELATED APPLICATIONS

This application claims priority under 35 U.S.C. § 120 to G.B. Patent Application No. 1603785.5, filed Mar. 4, 2016, entitled "Communication System," the disclosure of which is incorporated by reference herein in its entirety.

BACKGROUND

A user terminal, such as a mobile phone, a desktop computer, tablet, laptop, phablet and the like, may be used for providing various services to a user. Example services include email, user profile, electronic wallets, contact list, etc. A service may be defined by a monolithic computer program, meaning that it contains everything necessary to execute the desired functionality, or may be composed of a plurality of modular computer programs (each of which modular computer programs containing everything necessary to execute the desired functionality of that modular computer program). At any point in the execution of a computer program, the computer program has data stored as variables, which represents storage location in memory. The contents of these memory locations at a given point in the program's execution is known as the state of the computer program/service, and may be represented by a unique value. It is important that both the user terminal and the network entity providing the service synchronise with each other regarding any changes in state in the service to ensure reliability of service provision. There must therefore be an exchange in state between the two entities.

The current state of any particular service may be kept in a respective master server located in the network. The user terminal may then query the master server for state information and/or details of data changes in the service, such as when a new email message needs to be downloaded. The user terminal may be notified of when to query the master server via a push notification server. This push notification server sends (unsolicited) a message to the user terminal whenever a change in state of a particular service for the user has occurred. The user terminal responds to receipt of this notification by contacting the master server for more information regarding the state change. For example, the notification may let the user terminal know that there is a message to download from the master server. In response to this, the user terminal may contact the master server to provide the message details. It is understood that changes in state may also be caused/instigated at the user side. Information on this state change/request to state change may therefore also be provided to the master server.

SUMMARY

The inventors have realised that the push notifications from the push notification server do not have guaranteed delivery to the user terminal and so notifications may be readily lost.

One solution to this would be to periodically poll the master server for state information. However, the inventors have realised that this may cause the master server to become overloaded, as it receives poll requests from multiple user terminals. Moreover, as the poll requests to the master server from the user terminal do not always return new/changed state information, these consume resources of the user terminals (such as battery and network bandwidth) unnecessarily. This is disadvantageous in user terminals operating off battery power supply and those user terminals on a metered connection, who may use up their data allowance on these unnecessary communications.

The following aims to provide a system that addresses these issues.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, there is provided a method comprising: transmitting, by a user terminal, to a state server a request for state change information of a service provided by the user terminal; receiving, by the user terminal, an indication of said state change information from the state server; and using, by the user terminal, said received indication to determine whether or not to suppress a polling relating to said service of a master server.

According to a second aspect, there is provided an apparatus (e.g. a user terminal) comprising: at least one processor; and at least one memory comprising computer code that, when executed by the at least one processor, causes the apparatus to: transmit to a state server a request for state change information of a service provided by the user terminal; receive an indication of said state change information from the state server; and use said received indication to determine whether or not to suppress a polling relating to said service of a master server.

According to a third aspect, there is provided a computer program comprising code means adapted to cause performing of the steps of any of claims 1 to 12 when the program is run on data processing apparatus.

FIGURES

For a better understanding of the subject matter and to show how the same may be carried into effect, reference will now be made by way of example only to the following drawings in which:

FIGS. 4 to 9 illustrate various signalling between entities in examples of the described communication system.

DETAILED DESCRIPTION

Figure 1:
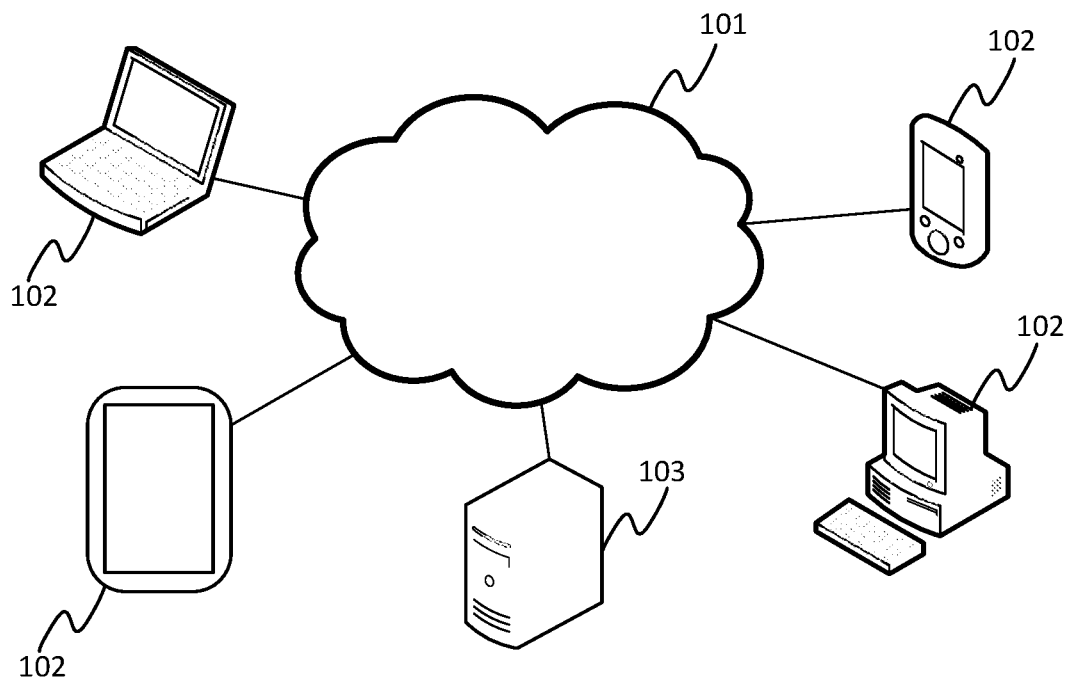
FIG. 1 is a schematic illustration of a communication system.

According to the following, there is provided a mechanism to reduce the burden on a master server when change in state information is desired. The term master server is used herein to denote a network entity/apparatus that is used to provide a service to at least one user terminal. As this service is provided to a user via the at least one user terminal, the user terminal may also be said to provide the service.

In particular, in a system in which there is a user terminal configured to poll a master server for state information, there is provided another server (hereinafter referred to as the state server) from which state change information (or information indicative thereof) may be pulled by the user terminal. The term state change information is used herein to denote information that is indicative of whether or not a change in state has occurred. The user terminal pulls the state change information from the state server by polling the state server for state change information and receiving at least an indication of a change in the state information in response. The user terminal may use this pulled indication to determine whether or not to suppress a retrieval of state information from the master server (i.e. the server that provides the service to the user terminal). In other words, the user terminal may determine whether or not to override its configuration to poll the master server for state information based on state change information received from the state server.

As discussed in more detail below, the state of a service may be represented by a unique value such that changes in this value may indicate that a change in state has occurred. Where a service is comprised of multiple microservices, each microservice may have an associated value indicative of their state. Moreover, a service comprised of multiple microservices may also have its own value indicative of the state of that service. This overall state may be formed from an aggregation of the states of the microservices from which the service is formed. In other words, the overall state may be dependent on the current states of the microservices from which the service is formed. This means that a change in state in one of those microservices automatically also changes the value used to denote the state of the service as a whole. In addition, this technique may be applied to all of the services used by a particular user. For example, a user of the system commonly has a unique identifier that can be used to identify him/her (e.g. a user ID). This user may be associated with a plurality of services to which that user is subscribed. The services may or may not be formed of microservices, but each of said plurality of services have their own value representing a current state of those services. These values may be aggregated together to form a current state of the user as a whole. In other words, the state of the user as a whole (e.g. a user profile state) may be dependent on the states of the services to which the user is subscribed. Therefore, a user terminal may poll for change in state information regarding the user as a whole using a single value (the "user profiled state"). A change in state for the user profile may therefore indicate that the state of at least one service to which the user is subscribed has changed.

The determination may be done in a variety of ways. In the main, the pulled state change information is used by the user terminal to determine whether or not there has been a change in state for a particular service. The user terminal may comprise a local cache that comprises the current state for each service. When the indication of the current state of a service is received from the state server, the user terminal may compare this received state to the current state stored in its local cache. If these are different (i.e. if there has been a change in the state of which the user terminal was previously unaware), the user terminal may poll the master server as scheduled. However, if the comparison yields that the stored current state is the same as the current state stored on the server, the user terminal supresses the scheduled polling to the master server so that the master server is not polled. In other words, the user terminal may be configured to only retrieve state information from the master server after receiving pulled state change information when the pulled state change information indicates that the current state information for a particular service is different to the state information for that service stored on the user terminal. To this effect, any scheduled polling of the master server to retrieve state and/or service information may be suppressed/cancelled if the user terminal determines from the pulled state information that there has been no change in state for a particular service.

As an example, we consider the case where the service is a contacts application. Initially, it is assumed that the user terminal polls a state server for information regarding the state of the contacts application. In response to this polling, the user terminal receives an identifier from the state server that is indicative of the current state. This identifier is compared to a corresponding identifier for the contacts service that is stored locally in the user terminal. This comparison reveals that there has been no change of state in the contacts application (e.g. there are no new contacts to add/remove). Consequently, when the next scheduled time comes for the user terminal to poll the contacts master server for state information for the contacts service, the user terminal suppresses this and so does not poll the contacts master server when scheduled.

Subsequently, it is assumed that the state of the contacts application has changed (e.g. a new contact has been added). This change in state may be pushed to the user terminal by a push notification system. This notification of the change in state may be lost. As the notification has been lost, the user terminal may be configured to query the current state from the state server. As the user terminal is unaware of the lost push notification, the user terminal may be configured to query the current state from the state server at regular periodic or aperiodic intervals. In response to the query, the state server returns an identifier for the contacts service that is different to the state identifier stored locally on the user terminal. The different identifiers indicate that the state has changed (e.g., that a new contact has been added to the contacts list). Consequently, when the next scheduled time comes for the user terminal to poll the contacts master server for state information for the contacts service, the user terminal polls the contacts master server as scheduled. In this manner, the master server is only ever polled when there is new/updated state information to retrieve, which reduces the burden on the master server.

In order that the environment in which the present system may operate be understood, by way of example only, we describe a potential communication system and user terminal into which the subject-matter of the present application may be put into effect. It is understood that the exact layout of this network is not limiting.

FIG. 1 shows an example of a communication system in which the teachings of the present disclosure may be implemented. The system comprises a communication medium 101, in embodiments a communication network such as a packet-based network, for example comprising the Internet and/or a mobile cellular network (e.g. 3GPP network). The system further comprises a plurality of user terminals 102, each operable to connect to the network 101 via a wired and/or wireless connection. For example, each of the user terminals may comprise a smartphone, tablet, laptop computer or desktop computer. In embodiments, the system also comprises a network apparatus 103 connected to the network 101. It is understood, however, that a network apparatus may not be used in certain circumstances, such as some peer-to-peer real-time communication protocols. The term network apparatus as used herein refers to a logical network apparatus, which may comprise one or more physical network apparatus units at one or more physical sites (i.e. the network apparatus 103 may or may not be distributed over multiple different geographic locations).

Figure 2:
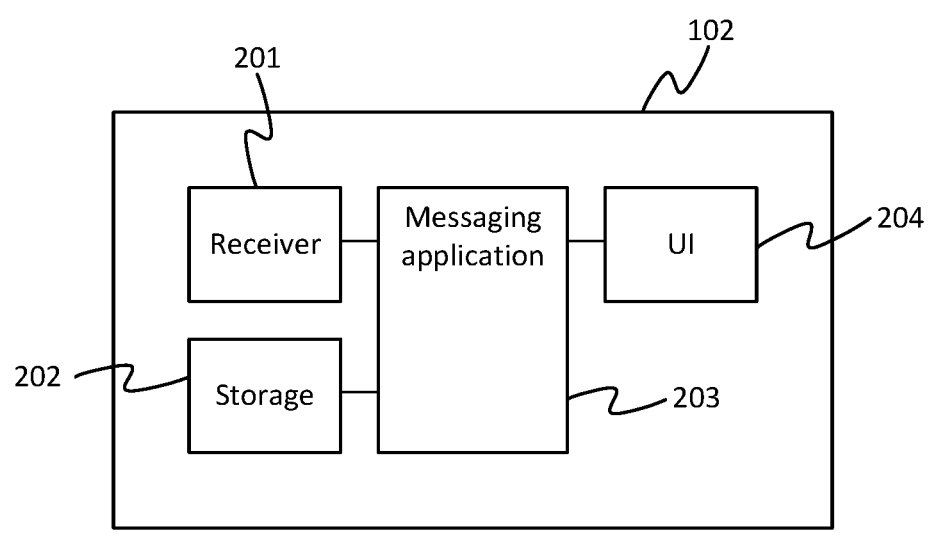
FIG. 2 is a schematic block-diagram of a user terminal.

FIG. 2 shows an example of one of the user terminals 102 in accordance with embodiments disclosed herein. The user terminal 102 comprises a receiver 201 for receiving data from one or more others of the user terminals 102 over the communication medium 101, e.g. a network interface such as a wired or wireless modem for receiving data over the Internet or a 3GPP network. The user terminal 102 also comprises a non-volatile storage 202, i.e. non-volatile memory, comprising one or more internal or external non-volatile storage devices such as one or more hard-drives and/or one or more EEPROMs (sometimes also called flash memory). Further, the user terminal comprises a user interface 204 comprising at least one output to the user, e.g. a display such as a screen, and/or an audio output such as a speaker or headphone socket. The user interface 204 will typically also comprise at least one user input allowing a user to control the user terminal 102, for example a touchscreen, keyboard and/or mouse input.

Furthermore, the user terminal 102 comprises a messaging application 203, which is configured to receive messages from a complementary instance of the messaging application on another of the user terminals 102, or the network apparatus 103 (in which cases the messages may originate from a sending user terminal sending the messages via the network apparatus 103, and/or may originate from the network apparatus 103).

The messaging application is configured to receive the messages over the network 101 (or more generally the communication medium) via the receiver 201, and to store the received messages in the storage 202. For the purpose of the following discussion, the described user terminal 102 will be considered as the receiving (destination) user terminal, receiving the messages from one or more other, sending ones of the user terminals 102. Further, any of the following may be considered to be the entity immediately communicating with the receiver: as a router, a hub or some other type of access node located within the network 101. It will also be appreciated that the messaging application 203 receiving user terminal 102 may also be able to send messages in the other direction to the complementary instances of the application on the sending user terminals and/or network apparatus 103 (e.g. as part of the same conversation), also over the network 101 or other such communication medium.

The messaging application comprises code that, when executed on a processor, causes a display to render a conversation visualisation environment. The conversation visualisation environment is as described above, and provides a visual indication of events associated with audio-visual calls.

The messaging application may transmit audio and/or visual data using any one of a variety of communication protocols/codecs. For example, audio data may be streamed over a network using a protocol known Real-time Transport Protocol, RTP (as detailed in RFC 1889), which is an end-to-end protocol for streaming media. Control data associated with that may be formatted using a protocol known as Real-time Transport Control Protocol, RTCP (as detailed in RFC 3550). Session between different apparatuses may be set up using a protocol such as the Session Initiation Protocol, SIP.

The following discusses particular embodiments of the presently described system. It is understood that various modifications may be made within these embodiments without exceeding the scope of the claimed invention.

Figure 3:
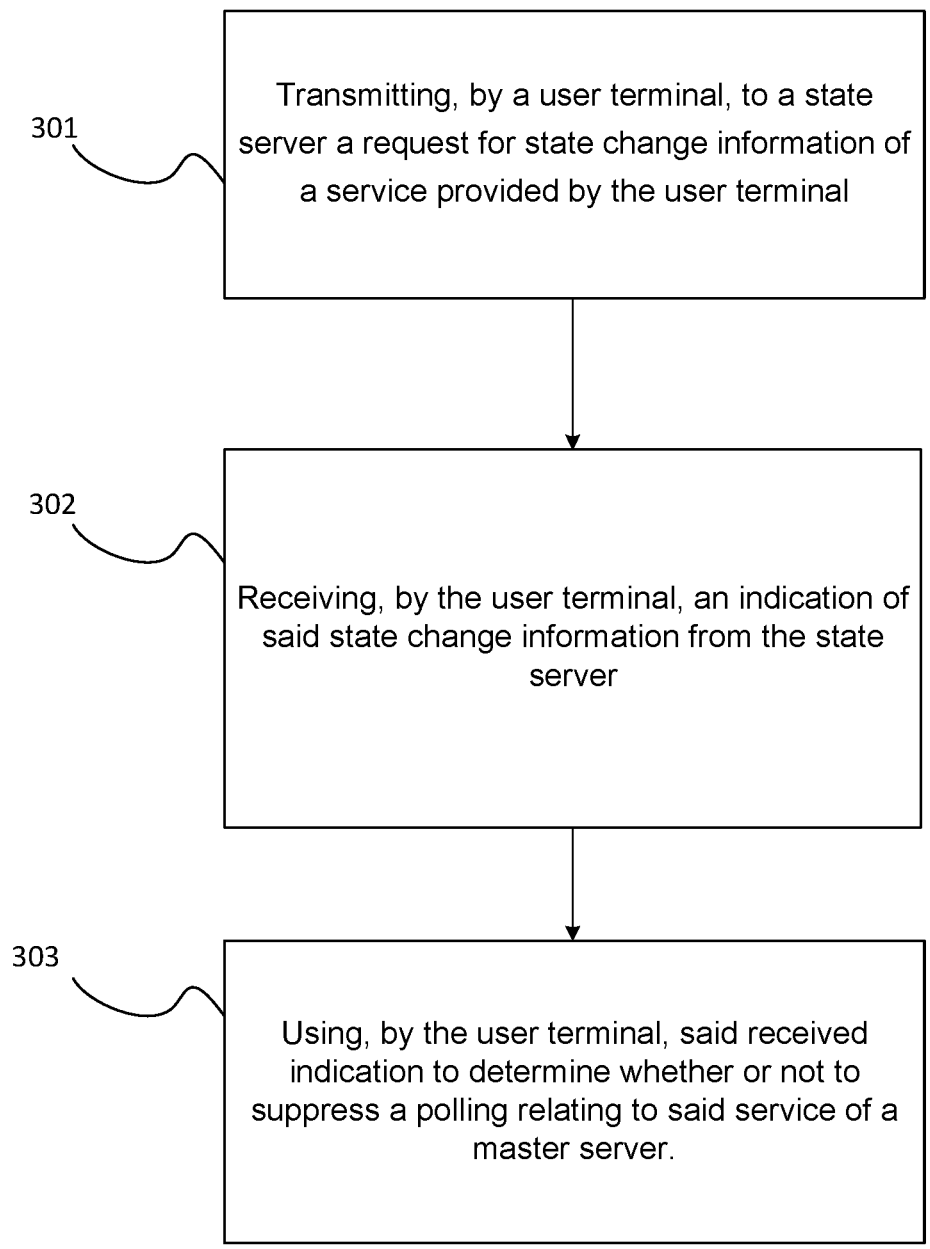
FIG. 3 is a flow chart illustrating potential actions by a user terminal.

FIG. 3 is a flowchart that illustrates potential actions that may be performed by a user terminal operating in accordance with some of the examples taught herein.

At step 301, the user terminal is configured to transmit to a state server a request for state change information of a service provided by the user terminal. In one example, the request may comprise a copy of an identifier of the current state of the service that is stored at the user terminal. In another example, the request may simply request information relating to the current state of the service stored at the state server without comprising a copy of the identifier of the current state of the service stored at the user terminal.

At step 302, the user terminal is configured to receive an indication of the requested state change information from the state server in response to the transmitter request. The indication may take many different forms, depending on the service involved and the implementation chosen.

For example, the received state information may comprise a current state identifier, such as an entity tag (ETag) as used in HTTP. An ETag is an opaque identifier assigned by a web server to a specific version of a resource found at a uniform resource identifier. If the resource representation at that URL ever changes, a new and different ETag is assigned. The current state identifier/ETag uniquely identifies the state of a service at any particular time.

In another example, the received state information may simply indicate whether or not the state information has or has not changed without providing a specific identifier. In this case, the state server may have received a copy of the identifier stored at the user terminal (as described above) and/or received a time stamp for when the identifier stored at the user terminal was last updated, and used this information to determine whether or not the state information stored at the state server is different/has changed since that time. The result of this determination may then be provided to the user terminal. An advantage in using an identifier in this way to indicate and/or determine a state change is that it does not cause any privacy issues in the system, as no private information is used to determine the identifiers.

The indication may comprise further information regarding the change in state, such as the information that has actually changed. However, the transmittal of this information can be resource intensive (in terms of the amount of data to be transmitted, the memory required to store the changed information, etc.) and so it may not be considered suitable for every type of service or for every change in service information.

At step 303, the user terminal is configured to use the received indication to determine whether or not to suppress a polling relating to said service of a master server. In particular, if the received indication indicates to the user terminal that the state information has changed, the user terminal does not deviate from its programming to poll the master server as normal/scheduled. In contrast, if the received indication indicates to the user terminal that the state information has not changed, the user terminal deviates from its programming to poll the master server as normal/scheduled and so does not poll the master server for current service information.

The service being queried may be a unique monolithic service and/or may be built from multiple modular services (e.g. microservices). The unique monolithic service may be a modular service to another service. Where the service being polled for state information comprises multiple modular services, the received indication from the state server may comprise an identifier for the service as a whole and/or comprise identifiers for each of the modular services that contribute to the service. This latter option allows the user terminal to be selective in which master servers to poll for further information as otherwise all of the master server(s) for modular services would have to be polled for further information if there are no separate identifiers. It is understood that a single master server may provide state information for only one or for multiple services, depending on the selected implementation.

As detailed above, the state of a service may be represented by a unique value (such as an eTag) such that changes in this value may indicate that a change in state has occurred. Where a service is comprised of multiple microservices, each microservice may have an associated value indicative of their state. Moreover, a service comprised of multiple microservices may also have its own value indicative of the state of the service. This overall state may be formed from an aggregation of the states of the microservices from which the service is formed. This means that a change in state in one of those microservices automatically also changes the value used to denote the state of the service as a whole. In addition, this technique may be applied to all of the services used by a particular user. For example, a user of the system commonly has a unique identifier that can be used to identify him/her (e.g. a user ID). This user may be associated with a plurality of services to which that user is subscribed. The services may or may not be formed of microservices, but each of said plurality of services have their own value representing a current state of those services. These values may be aggregated together to form a current state of the user as a whole. Therefore, a user terminal may poll for change in state information regarding the user as a whole using a single value. A change in state for the user terminal may therefore indicate that the state of at least one service to which the user is subscribed has changed.

The user terminal may poll for state information in a variety of different ways. For example, as described above, the user terminal may be configured to poll for state information for the user as a whole. When it is indicated that the state information for a user as a whole has changed, the user terminal may then poll for changes in state of different services to which the user is subscribed. This may reduce the amount of signalling required overall, as polling for individual services is only ever performed if the state of the user profile has changed. Similarly, this may be applied to different microservices within a particular service, where individual microservices forming a service only have their state polled when the state of the overall service changes. As another example, instead of providing a single value in response to a poll for a state of a user, the state server may provide values for the state of each service associated with the user. The state server may be configured to only provide this expanded state information when the state server has determined that a change in state has occurred for the user terminal. Alternatively, this expanded state information may be provided in response to any poll regarding the current state of the user terminal.

When polling for a change in state from the state server, the user terminal may provide details of the current state stored at the user terminal for that service/services/user to the state server. The state server may perform its own comparison to determine whether or not there has been a state change at the user terminal. For example, local changes at the user terminal may cause a state change. Where a state change has been made at the user terminal side, this may cause the state server to update its state for that server.

The current value of the state may be associated with a time stamp indicative of the time at which the current value changed. These time stamps may be further used to determine which state corresponds to the most recent set of events and may be used to resolve conflicts. For example, where the current state on the user terminal for a service is signalled to the state server and this differs from the current state for the service on the state server, the respective time stamps denoting when the states were updated on each of the state server and the user terminal may be used to determine which state (i.e. on which entity) is the most recent state change and so should be saved at both entities.

The current value of the state may be provided to the user terminal from the state server when there has been a state change. This may be used by the user terminal (using a compare operation with the current value of the state stored in the user terminal) to determine whether or not the state has changed and so whether a master server should be polled or not. However, it is understood that the state server may simply provide a notification that the polled state has changed without providing the new state value. The new state value may instead be pulled from the master server during the subsequent polling (depending on the implementation).

If the current state of a service/services/user is provided to the state server, the state server may compare this received state to the state stored at the state server. The state server may determine the form of notifications it provides to the user terminal in dependence on this comparison. For example, the state server may be configured to only transmit back to the user terminal the value(s) for each requested state when it is determined that there has been a change in state. All of the requested state values may be transmitted back, or only those that have been changed (depending on how the system has been implemented). If there has been no change, the state server may simply respond with an indication that has a "no change" bit set. This may help save overhead in the system. However, it is understood that the state server may instead be configured to always provide details of the current value of the state stored at the server.

As mentioned above, the above-described system may also be used in combination with a push notification server. A push notification server is configured to push a notification towards the user terminal when a change in state occurs. The notification may simply be a notification that a change has occurred without providing more information. The notification may identify which variable has changed. The notification may provide the changed information itself so that the user terminal does not have to poll the master server for the new service information. As mentioned above, the notification from the push notification server is not always received by the user terminal, as there is not guaranteed delivery and some links may be lossy. The use of the state server may help to mitigate against the effect of any lost push notifications. For example, if no push notifications have been received for longer than a predetermined time for a particular service, the user terminal may be configured to poll the state server for service state information for that particular service. The length of this predetermined time may depend on the service being provided and historical knowledge regarding the frequency of state information changes for that service.

Examples of various signalling under the above-mentioned system are described with reference to FIGS. 4 to 9.

Figure 4:
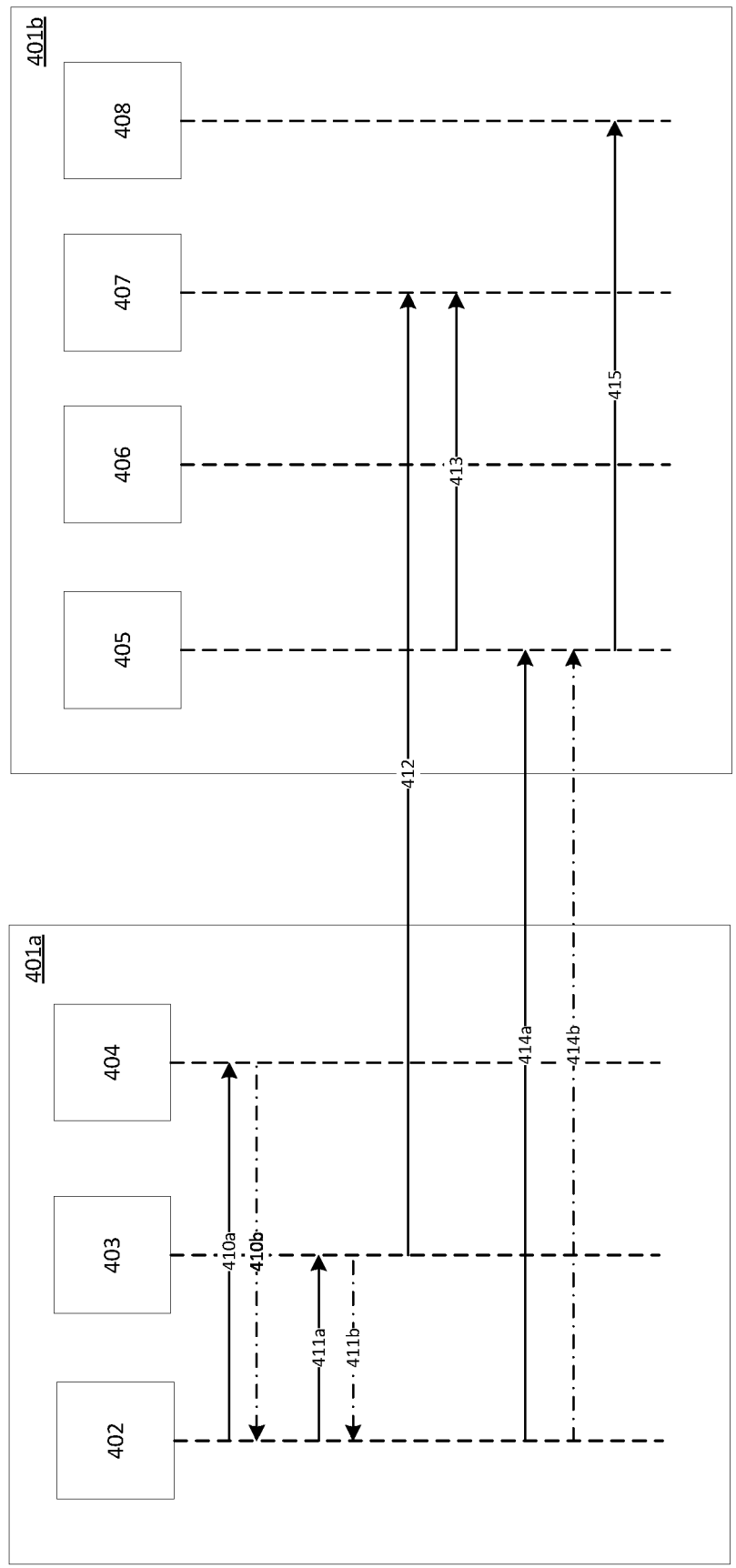

In FIG. 4, there is shown a network side 401*a* and a user terminal side 401*b*. The network side comprises master server 402, push notification server 403 and state server 404. The user terminal side comprises a master library 405, a state server library 406, a push notification library 407 and a user interface 408.

At the network side, the state information for a particular service changes at the master server 402. This is signalled to the state server 404 by the master server sending a new state identifier to the state server 404 in message 410*a*. Optionally, receipt of this state identifier is acknowledged to the master server 402 by state server 404 in message 410*b*. The master server 402 then signals details of the state change to push notification server 403 in message 411*a*. Optionally, receipt of this message 411a is acknowledged to master server 402 by push notification server 403 in message 411b.

Push notification server then sends an indication of this state change to push notification library 407 in message 412. In response to receiving this, push notification library signals the master library 405 in message 413 to notify the master library of this change. The master library 405 may then retrieve details of the information changed in the state change from the master server 405 by polling the master server 402 in message 414a. The master server may respond to the master library 405 poll by providing further details on the state change in message 414b. In response to this message, the local storage caches of the user terminal are updated and the master library 405 sends a message 415 to the user interface to cause the change in state to be rendered to a user of the user terminal (e.g. via a display).

Figure 5:
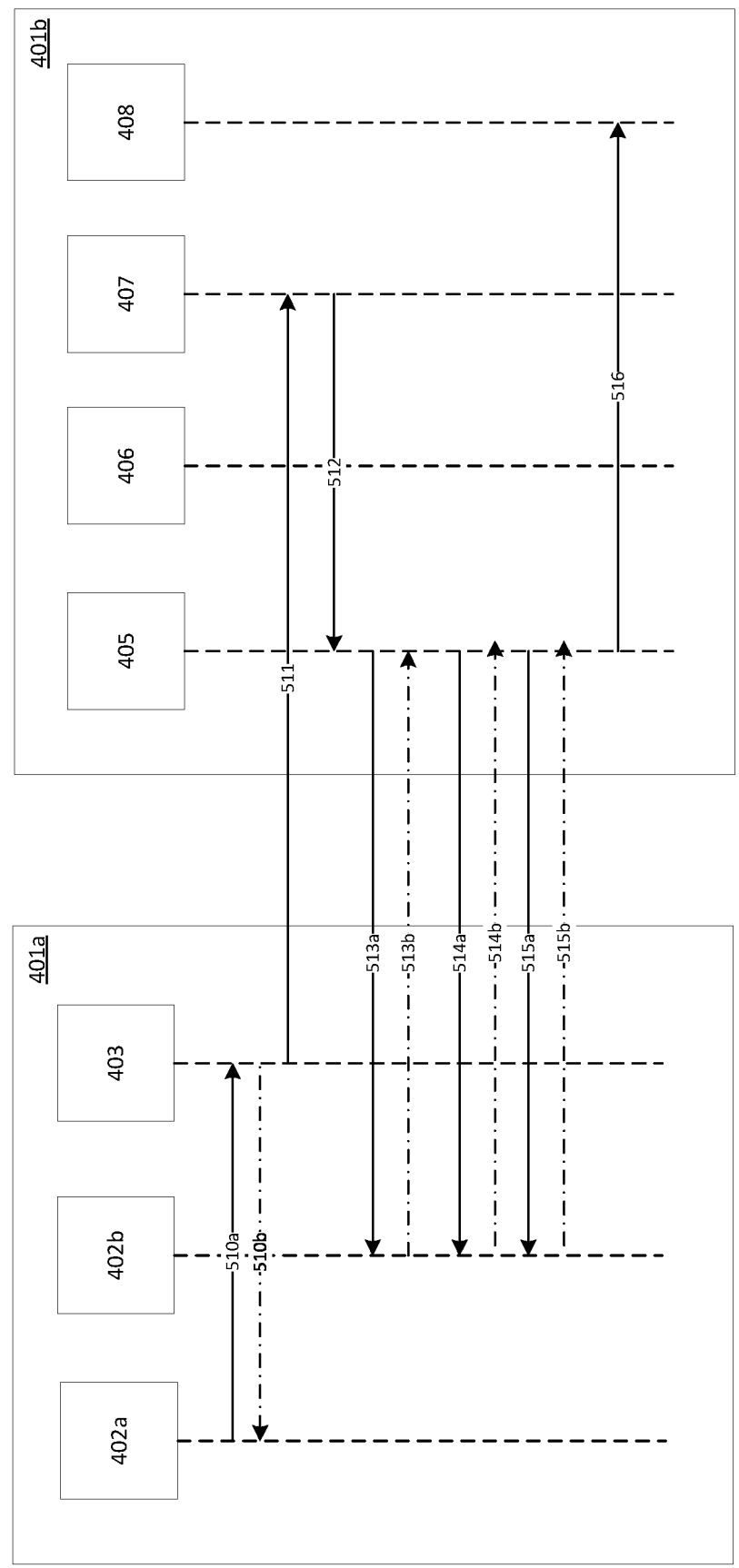

The architecture in FIG. 5 differs from that in FIG. 4 in that no state server is shown in the network side 401a and in that the master server 402 is depicted in two parts: 402a and 402b. The remaining architecture is the same as shown in FIG. 4 and so the same numbering is utilised to ensure clarity. However, it is understood that this is not limiting.

In FIG. 5, the state information for a particular service changes at the first master server 402a. This is signalled to the push notification server 403 by the first master server sending a new state information (e.g. new state identifier) to the push notification server 403 in message 510a. Optionally, receipt of this state identifier is acknowledged to the master server 402 by the push notification server 403 in message 510b. The push notification server 403 then signals this change in state to the push notification library 407 in the user terminal 401b in signal 511. In response to this, the push notification library 407 signals this change to the master server library 405 in signal 512. In response to this signal, the master server library 405 requests 513a that the second master server provides this information. At this point in time, the second master server 402b has not been updated and so returns information regarding the previous state to the master library 405 in message 513b.

On receiving this message 513b, the master library 405 waits for a time period before again requesting the new state information in message 514a to the second master server 402b. At this point in time, the second master server still has not been updated and so again returns information regarding the previous (i.e. non-updated) state to the master library 405 in message 514b. On receiving this message 514b, the master library again waits for a time period before requesting the new state information in message 515a to the second master server 402b. This time period may be the same as or different to the previous time period (e.g. a random backoff time may be used). At this point in time, the state information in the second master server has been updated and so the new state information is returned to the master library 405 in message 515b. On receipt of this message, the master library 405 notifies 516 the user interface 408 to update the details of the service being rendered on a user interface.

Figure 6:
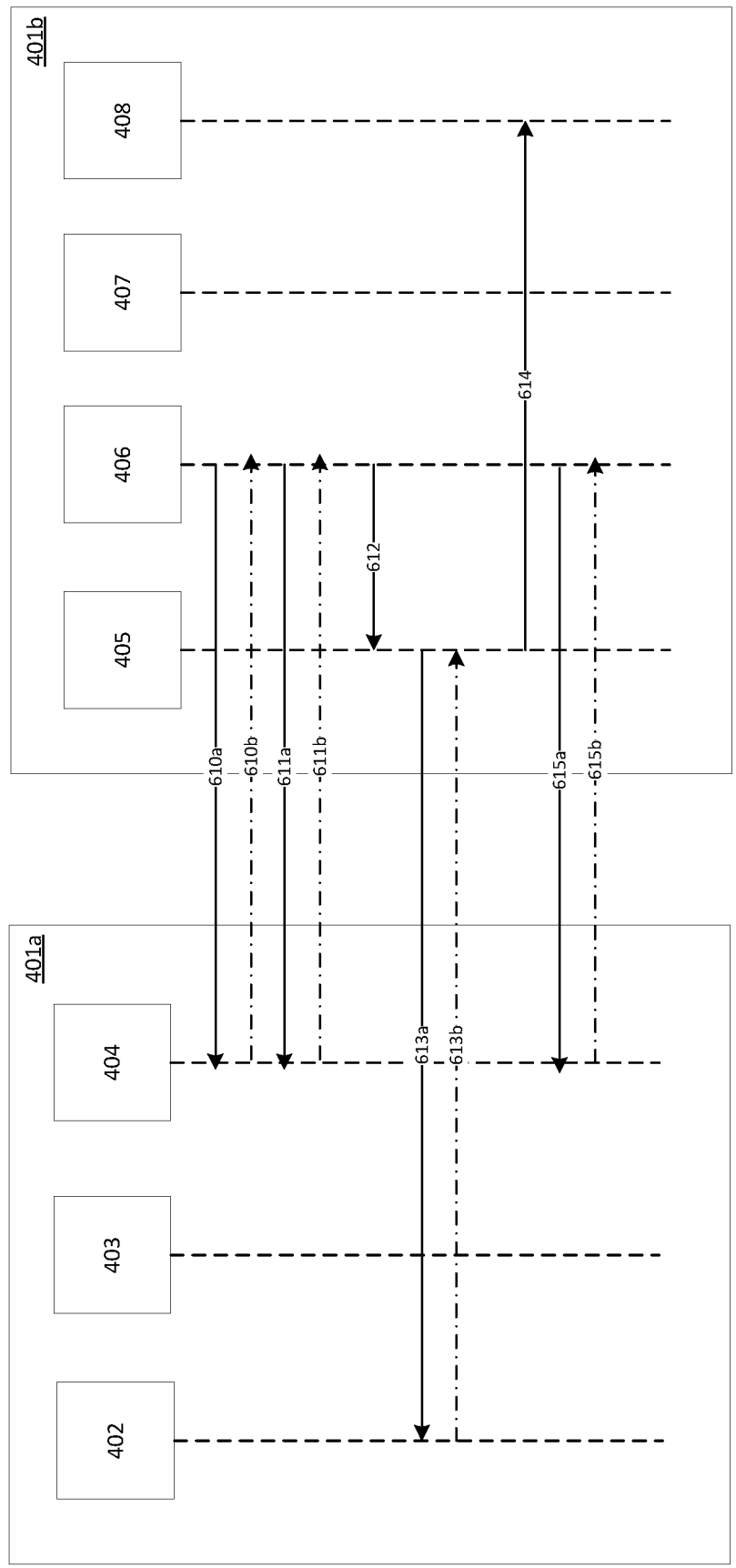

The architecture of FIG. 6 is the same as in FIG. 4 and so the same numerals are used for these elements. It is understood that this is not limiting.

In the example of FIG. 6, the state library 406 of the user terminal 401b polls 610a state server 404 in the network side 401a for state information with respect to a service. At this point in time, there is no change in state information. An indication 610b to this effect is therefore provided to the state library 406 from the state server 404. After a time period after receiving this response, the state library again polls 611a state server 404 for state information with respect to a service. On this occasion, the state server 404 responds 611b to the state library 406 with an indication of a change in state (e.g. a new identifier for the state). This is stored locally by the state library 406, before the state library 406 notified 612 the master library 405 of a change in state information. In response to this, the master library 405 queries 613a master server 402 in the network 401a for new state information. The new state information is transmitted 613b to the master library 405 from the master server 402 in response to this query 613a. On receipt of the new state information, the master library 405 notifies 614 the user interface 408 of the change in state to update what is being rendered via the user interface.

Independently of the actions of the master server 402 and master library 405, the state library may continue to poll 615a the state server 404 for state change information after a time period. This time period may be the same or different to the previous time period. As there has been no change in state recorded at the state server 404 since the previous (notified) update 611b, the state server returns to the state library 406 a message 615b indicating that there has been no change in the state information. The state library may then wait another time period before polling the state server 404 again. As previously mentioned, the time period may be the same as or different to the previous time period waited by the state library between polls. In an example, an exponential back-off algorithm is used to determine when to poll.

Figure 7:
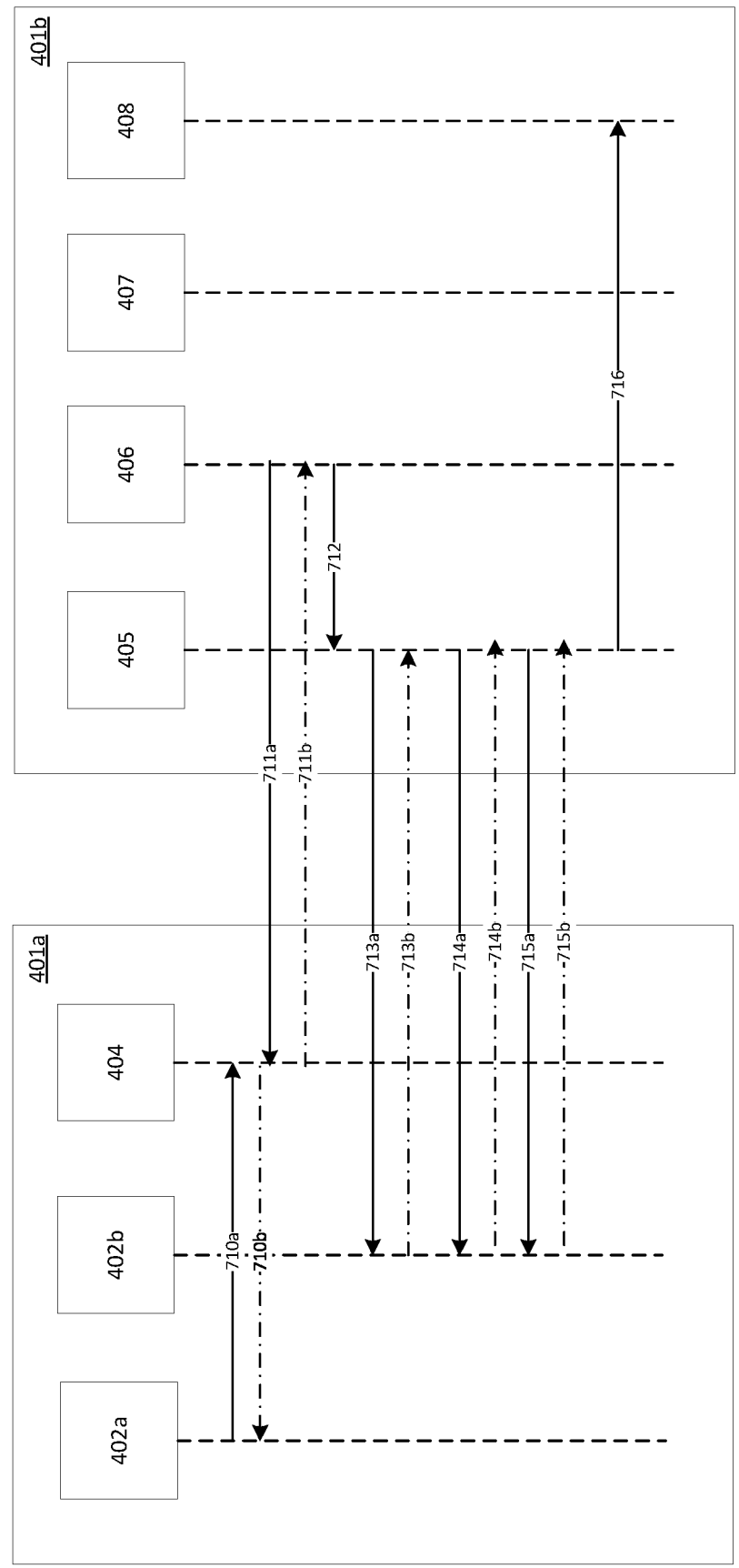

FIG. 7 utilises the same architecture of FIG. 5b, bar the push notification server 403 is not shown whilst the state server 404 is. Therefore the same numerals will be used for consistency with these elements. It is understood that this is not limiting.

Initially, we assume that the state of a particular service is updated in the first master server 402a. This is signalled 710a to the state server 404 and is optionally acknowledged 710b by the state server 404 to the first master server 402a. Subsequently, the state library 406 polls 711a the state server 404 for state information relating to a particular service and receives a response 711b from the state server 404 indicating that the state of the service has changed. In response to this, the state library 406 notifies 712 the master library 405 that there has been a change in state for that service. The master library 405 then polls 713 the second master server 402b for information regarding that change in state. At that point in time, the cache of the second master server 402b has not been updated to reflect the state change, and so the second master server responds 713b with the previous state information (pre-update). In response to this, the master library 405 waits for a time period before again polling 714a the second master server 402b for new state information. In this example, the state information has still not been updated at this point in the second master server 402b and so the second master server 402b responds 714b with the previous state information. Again, in response to this, the master library 405 waits for a time period (which may be the same as or different to the previous time period) before polling 715a the second master server 402b for new state information. In response to this poll 715a, the second master server 402b responds 715b with new state information. On receiving the new state information, the state library 404 signals 716 the user interface 408 to update details of the service currently being rendered to reflect the new state information.

Figure 8:
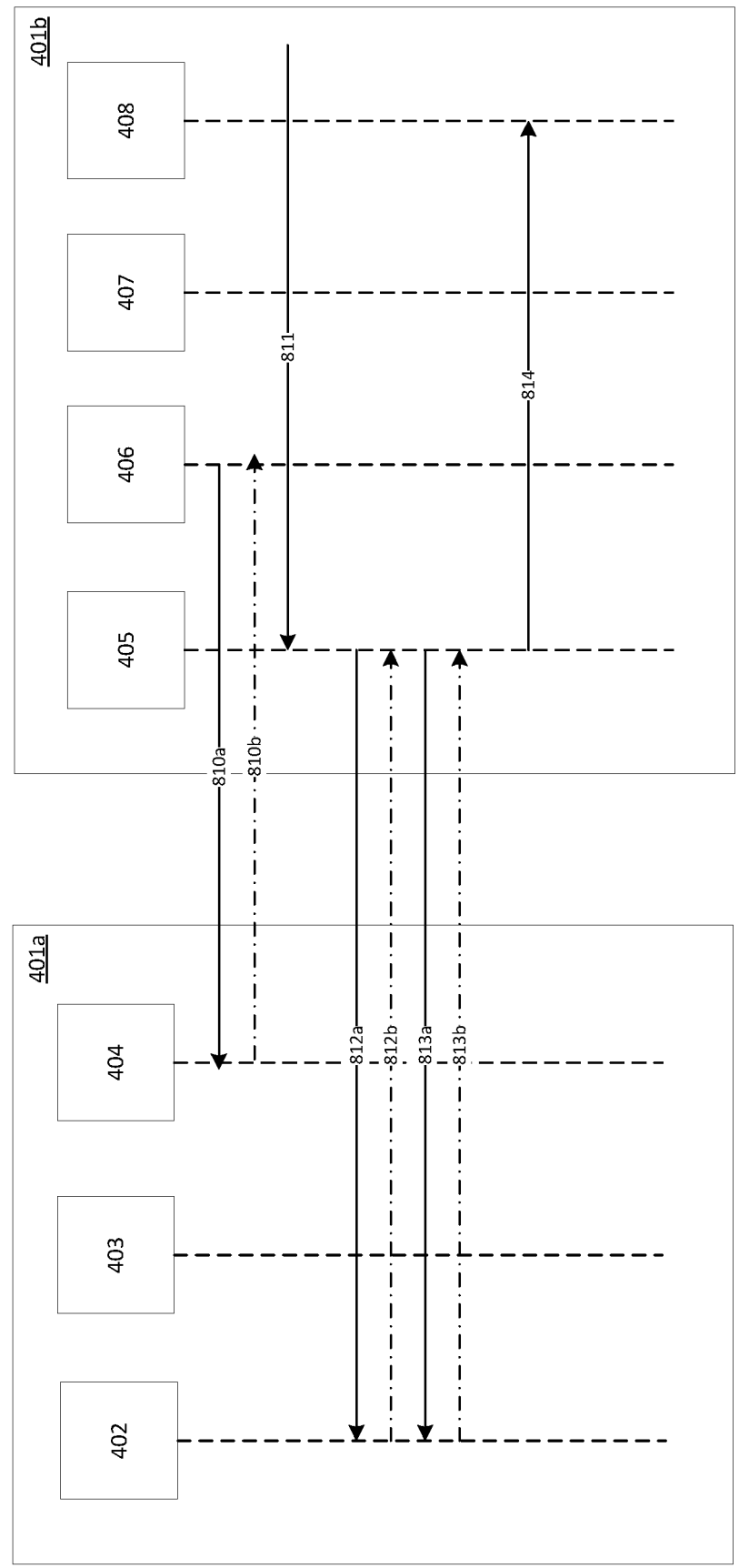

FIG. 8 utilises the same architecture as FIG. 4, and so the same numerals for the architecture will be used for consistency. It is understood that this is not limiting.

In FIG. 8, the state library 406 polls 810a the state server 404 for an indication of a change in state of a particular server. The state server 404 responds to this with a message 810*b* indicating that the state has not changed. Subsequently, the user interface 408 receives an indication that a state change has occurred for that service (e.g. a user has made a purchase) and signals 711 this information to the master library 404. The master library may poll 712*a* the master server 402 for state information regarding that state change. At this point, the master server 402 does not have information regarding the state change and so responds 712*b* with the old state information. The master library 405 may then wait a time period before again polling 713*a* the master server 402 for new state information. At this point, the state information has been updated at the master server 402, and so the master server 402 responds 713*b* with the new state information. In response to this new state information, the master server 405 notifies the user interface 408 of the new state information for presentation to a user. For example, the user interface 408 may cause an electronic wallet to shown a new balance where the service relates to such.

FIG. 9 relates to how the master server 402 may have its state information updated by a service provider 901. For clarity, corresponding architecture elements corresponding to those in FIGS. 4 to 8 will be referred to using the same numerals.

The service provider 901 in FIG. 9 comprises an order management user 902 and a service storage 903. The user terminal 401*b* polls 910*a* the master server 402 for information regarding a change in state (for example, for a new contact on a contact list). At this point, there is no change in the previous state information stored at the master server 402 and so the master server 402 responds 910*b* with an indication of the previous state information. Also in response to this poll, the master server 402 polls 911*a* the service storage 903 for new storage information and this is optionally acknowledged 911*b* by the service storage 903. Following a time period, the user terminal 401*b* again polls 912*a* the master server 402 for new state information. Again, at this point the state information for the service has not been updated in the master server 402 and so the master server responds 912*b* with the previous state information. Subsequent to this, the service storage 903 sends 913*a* new state information (e.g. details for the new contact) to the master server 402, which is optionally acknowledged 913*b* by the master server 402. Subsequent to receiving the new state information, the user terminal 401*b* again polls 914*a* the master server 402 for new state information. In response to this poll 914*a*, the master server 402 responds 914*b* to the user terminal 401*b* with the updated state information.

In relation to the above, the master library/user terminal may poll the master server for service information using http requests, such as a GET request. The HTTP header may comprise the state value (e.g. the ETag). The HTTP request may further comprise a timestamp for the ETag/state value. An example HTTP request may be of the form: GET/users/username/services3.0(ChangeTag+ETag).

The above-described techniques are particularly useful for non-real time services, where latency is less of an issue than for real-time services. Therefore, the above-described techniques may be only applied for non-real-time services. However, it is understood that these non-real-time services may form part of a communication environment in which real-time services coexist. For example, the services may act together to provide an environment for audio-visual calls. In such a situation, there are real-time services corresponding, for example, to the call itself, and non-real-time services corresponding to the environment for making the call (e.g. a contacts list, a user profile, a user avatar, etc.). In this case, the above-described techniques may be applied to only some of the services (e.g. the non-real-time services).

In all of the above described systems, the state server may be polled periodically or aperiodically. The state server may be polled a predetermined time period after a state change has been recorded without receipt of a push notification of a state change from the push notification server. The state server may be polled a predetermined time period before the master server is scheduled to be polled. These time periods may be different. The state server may be polled using an exponential and/or randomised back-off by the user terminal.

In the above systems, the user terminal is assumed to have a local cache in which current state information for the subscribed services is stored. As there may be many services, this cache, in addition to the cache on the state server, may be optimised for high read/write ratio.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In light of the above, there is provided a method comprising: transmitting, by a user terminal, to a state server a request for state change information of a service provided by the user terminal; receiving, by the user terminal, an indication of said state change information from the state server; and using, by the user terminal, said received indication to determine whether or not to suppress a polling relating to said service of a master server.

The indication may be an entity tag.

Said using may comprise: comparing the received indication to a locally stored value indicative of the state of the service; and determining to suppress said polling to the master server if there is a correspondence between the received indication and the stored value. Said using may further comprise determining to poll said master server if there is no correspondence between the received indication and the stored value.

The method may further comprise: receiving details regarding said state information with said indication; and determining to suppress said polling to the master server in dependence on the received details.

The method may further comprise: transmitting said request for state change information only when no notifications regarding a change in state in the service have been received from a push server within a predetermined preceding time period.

The service may comprise a plurality of microservices and said indication may comprise separate current state indications for each of said plurality of microservices. Said polling to the master server may be suppressed for only those microservices for which the received indication indicates that the state of that microservice has not changed.

The service may comprise a plurality of microservices and said indication may comprise a single current state indication for said service. Said single current state indication may be an aggregation of state information for a plurality of the services associated with the user of the user terminal.

The service may comprise a plurality of services and said indication may comprise a single current state indication for said service. Said single current state indication may be an aggregation of state information for each of the plurality of the services.

The service may be a non-real-time service.

The method may further comprise receiving a notification regarding a change in state of the service from a push notification server.

There is further disclosed an apparatus (e.g. a user terminal) comprising: at least one processor; and at least one memory comprising computer code that, when executed by the at least one processor, causes the apparatus to: transmit to a state server a request for state change information of a service provided by the user terminal; receive an indication of said state change information from the state server; and use said received indication to determine whether or not to suppress a polling relating to said service of a master server.

The indication may be an entity tag.

Said use may comprise: comparing the received indication to a locally stored value indicative of the state of the service; and determining to suppress said polling to the master server if there is a correspondence between the received indication and the stored value. Said use may further comprise determining to poll said master server if there is no correspondence between the received indication and the stored value.

The apparatus may be further caused to: receive details regarding said state information with said indication; and determine to suppress said polling to the master server in dependence on the received details.

The apparatus may be further caused to: transmit said request for state change information only when no notifications regarding a change in state in the service have been received from a push server within a predetermined preceding time period.

The service may comprise a plurality of microservices and said indication may comprise a single current state indication for said service.

There is further disclosed a computer program comprising code means adapted to cause performing of the steps of any of claims 1 to 12 when the program is run on data processing apparatus.

There is further disclosed an apparatus comprising: means for transmitting to a state server a request for state change information of a service provided by the user terminal; means for receiving an indication of said state change information from the state server; and means for using said received indication to determine whether or not to suppress a polling relating to said service of a master server.

The indication may be an entity tag.

Said use may comprise: comparing the received indication to a locally stored value indicative of the state of the service; and determining to suppress said polling to the master server if there is a correspondence between the received indication and the stored value. Said use may further comprise determining to poll said master server if there is no correspondence between the received indication and the stored value.

The apparatus may further comprise: means for receiving details regarding said state information with said indication; and means for determining to suppress said polling to the master server in dependence on the received details.

The apparatus may further comprise: means for transmitting said request for state change information only when no notifications regarding a change in state in the service have been received from a push server within a predetermined preceding time period.

The service may comprise a plurality of microservices and said indication may comprise a single current state indication for said service.

The invention claimed is:

1. A method comprising:
   transmitting, by a user terminal to a state server, a request for a state of a service provided by a master server to the user terminal, the state server being separate from the master server;
   receiving, by the user terminal from the state server, the state of the service;
   comparing the received state of the service to a stored state of the service to generate an indication that there is a state change for the service or that there is no state change for the service; and
   selectively suppressing, by the user terminal, a polling of the master server for state information for the service based on the indication that there is no state change for the service.

2. The method as claimed in claim 1, wherein the received state of the service includes an entity tag.

3. The method as claimed in claim 1, wherein the comparing comprises:
   comparing the received state of the service to the stored state of the service for correspondence between the received state of the service and the stored state of the service; and
   the selectively suppressing comprises:
   suppressing said polling of the master server when there is a correspondence between the received state of the service and the stored state of the service.

4. The method as claimed in claim 3, wherein, when there is no correspondence between the received state of the service and the stored state of the service, the selectively suppressing further comprises:
   polling the master server; and
   storing the received state of the service in place of the stored state of the service.

5. The method as claimed in claim 1, wherein:
   receiving the state of the service comprises receiving details regarding the state of the service; and
   the selectively suppressing further comprises suppressing the polling of the master server in dependence on the comparison of the received details regarding the state of the service and the stored state of the service indicating no state change for the service.

6. The method as claimed in claim 1, further comprising:
   transmitting said request for the state of the service responsive to an indication that the state of the service is not received from the state server within a predetermined preceding time period.

7. The method as claimed in claim 1, wherein the service comprises a plurality of microservices and the state of the service comprises separate current state indications for each of said plurality of microservices.

8. The method as claimed in claim 7, wherein the selectively suppressing comprises suppressing polling for one or more of the microservices for which the comparison of the received current states of the one or more microservices do not differ from respective stored states of the one or more microservices.

9. The method as claimed in claim 1, wherein the service comprises a plurality of microservices and received state of the service comprises a single current state for said service.

10. The method as claimed in claim 9, wherein said single current state includes an aggregation of state information of all of the plurality of the microservices.

11. The method as claimed in claim 1, wherein the service is a non-real-time service.

12. The method as recited in claim 1, wherein the received state of the service comprises data describing a current execution state of the service.

13. An apparatus comprising:
   at least one processor; and
   at least one memory comprising computer code that, when executed by the at least one processor, causes the apparatus to:
   transmit to a state server a request for a state of a service provided by a master server to a user terminal, the state server being separate from the master server;
   receive, from the state server, the state of the service;
   compare the received state of the service to a stored state of the service to generate an indication that there is a state change for the service or that there is no state change for the service; and
   selectively suppress a polling of the master server for state information for the service based on the indication that there is no state change for the service.

14. The apparatus as claimed in claim 13, wherein the received state of the service includes an entity tag.

15. The apparatus as claimed in claim 13, wherein the computer code that causes the apparatus to compare the received state of the service to the stored state of the service comprises computer code that causes the apparatus to:
   compare the received state of the service to the stored state of the service for correspondence between the state of the service and the stored state of the service; and
   the computer code that causes the apparatus to selectively suppress the polling of the master server comprises computer code that causes the apparatus to:
   suppress the polling of the master server when there is a correspondence between the received state of the service and the stored state of the service.

16. The apparatus as claimed in claim 15, wherein, when there is no correspondence between the received state of the service and the stored state of the service, the computer code that causes the apparatus to selective suppress the polling of the master server further comprises computer code that causes the apparatus to:
   poll the master server; and
   store the received state of the service in place of the stored state of the service.

17. The apparatus as claimed in claim 13, wherein:
   the computer code that causes the apparatus to receive the state of the service includes computer code that causes the apparatus to receive details regarding the state of the service; and
   the computer code that causes the apparatus to selectively suppress the polling of the master server includes computer code that causes the apparatus to suppress the polling of the master server in dependence on the comparison of the received details regarding the state of the service and the stored state of the service indicating no state change for the service.

18. The apparatus as claimed in claim 13, wherein the computer code further causes the apparatus to:
   transmit the request for the state of the service responsive to an indication that the state of the service is not received from the state server within a predetermined preceding time period.

19. The apparatus as claimed in claim 13, wherein the service comprises a plurality of microservices and the state of the service comprises a single current state for said service.

20. A memory device storing code that is executable by one or more processors to perform operations comprising:
   transmitting, to a state server, a request for a state of a service provided by a master server to a user terminal, the state server being separate from the master server;
   receiving from the state server, the state of the service;
   comparing the received state of the service to a stored state of the service to generate an indication that there is a state change for the service or that there is no state change for the service; and
   selectively suppressing a polling of the master server for state information for the service based on the indication that there is no state change for the service.

21. The memory device as recited in claim 20, wherein the operations further comprise:
   determining that the state of the service has not been received from the state server for a predetermined time, the predetermined time based on historical frequency of state information changes for the service; and
   polling, by the user terminal, the state server for service state information relating to the service in response to said determining.

* * * * *